United States Patent
Morimitsu et al.

(10) Patent No.: US 12,158,236 B2
(45) Date of Patent: Dec. 3, 2024

(54) LUBRICATING OIL TANK AND ROTARY MACHINE SYSTEM

(71) Applicant: MITSUBISHI HEAVY INDUSTRIES COMPRESSOR CORPORATION, Tokyo (JP)

(72) Inventors: Yuta Morimitsu, Hiroshima (JP); Michio Kubota, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 18/506,482

(22) Filed: Nov. 10, 2023

(65) Prior Publication Data

US 2024/0175544 A1 May 30, 2024

(30) Foreign Application Priority Data

Nov. 30, 2022 (JP) ................................ 2022-191477

(51) Int. Cl.
*F16N 19/00* (2006.01)
*F16N 39/06* (2006.01)

(52) U.S. Cl.
CPC ............. *F16N 19/00* (2013.01); *F16N 39/06* (2013.01)

(58) Field of Classification Search
CPC ................ F16N 19/00; F01M 11/0004; F01M 2011/0033
See application file for complete search history.

(56) References Cited

U.S. PATENT DOCUMENTS

| | | | | |
|---|---|---|---|---|
| 3,100,028 A | * | 8/1963 | Booth ................ | F01M 11/0004 123/196 R |
| 3,688,871 A | * | 9/1972 | Krestan .............. | F01M 11/0004 184/106 |
| 4,600,042 A | * | 7/1986 | York ..................... | F01M 11/04 141/330 |
| 4,793,299 A | * | 12/1988 | Ishimura .................. | F16M 1/02 123/195 A |
| 4,995,971 A | * | 2/1991 | Droste .................... | B03C 1/286 184/6.24 |
| 5,038,890 A | * | 8/1991 | Tanaka ................ | F01M 11/0004 123/196 R |

(Continued)

FOREIGN PATENT DOCUMENTS

JP S63-044446 A 2/1988

*Primary Examiner* — Michael A Riegelman
(74) *Attorney, Agent, or Firm* — Osha Bergman Watanabe & Burton LLP

(57) ABSTRACT

A lubricating oil tank includes: a tank casing extending in a first direction; a plurality of introduction portions disposed separately from each other in the first direction; a receiving portion disposed below the plurality of introduction portions in a vertical direction inside the tank casing and configured to receive the lubricating oil introduced from the plurality of introduction portions and cause the lubricating oil to flow toward a second end portion of the tank casing in the first direction; and a strainer configured to capture a foreign matter in the lubricating oil having flowed on the receiving portion. The receiving portion is inclined downward in the vertical direction toward the second end portion in the first direction. The strainer is disposed at a position closer to the second end portion than the plurality of introduction portions in the first direction.

6 Claims, 4 Drawing Sheets

(56) References Cited

U.S. PATENT DOCUMENTS

| | | | | |
|---|---|---|---|---|
| 6,340,012 B1* | 1/2002 | Yamashita | ......... | F01M 11/0004 |
| | | | | 123/195 C |
| 6,584,950 B1* | 7/2003 | Cunningham | ..... | F01M 11/0004 |
| | | | | 123/195 C |
| 7,171,937 B2* | 2/2007 | Hada | ................. | F01M 11/0004 |
| | | | | 123/196 R |
| 7,516,728 B1* | 4/2009 | Staley | ................ | F01M 11/0004 |
| | | | | 123/195 C |
| 8,196,710 B2* | 6/2012 | Hiramatsu | ......... | F01M 11/0004 |
| | | | | 184/106 |
| 11,022,011 B2* | 6/2021 | Lechartier | .............. | F01M 5/021 |
| 11,661,869 B1* | 5/2023 | Hudnall | ............. | F01M 11/0004 |
| | | | | 184/106 |
| 2007/0221447 A1* | 9/2007 | Bicker | ............... | F01M 11/0004 |
| | | | | 184/106 |
| 2008/0066982 A1* | 3/2008 | Kobayashi | ......... | F01M 11/0004 |
| | | | | 180/69.1 |
| 2010/0065014 A1* | 3/2010 | Dos Santos | .......... | F01M 11/064 |
| | | | | 123/196 R |
| 2011/0073062 A1* | 3/2011 | Nakashima | ........ | F01M 11/0004 |
| | | | | 184/106 |
| 2019/0153917 A1* | 5/2019 | Ono | ................... | F01M 11/0004 |
| 2019/0264589 A1* | 8/2019 | Lechartier | .......... | F01M 11/0004 |

* cited by examiner

LUBRICATING OIL TANK AND ROTARY MACHINE SYSTEM

CROSS-REFERENCE TO RELATED APPLICATIONS

This application claims the benefit of priority to Japanese Patent Application Number 2022-191477 filed on Nov. 30, 2022. The entire contents of the above-identified application are hereby incorporated by reference.

TECHNICAL FIELD

The disclosure relates to a lubricating oil tank and a rotary machine system.

RELATED ART

A rotor of rotary machines, such as a compressor, a turbine, and a motor is rotatably supported via a bearing. The bearing is supplied with lubricating oil fed from a lubricating oil tank by a pump or the like. The lubricating oil that has lubricated the bearing is discharged from the bearing, collected in the lubricating oil tank, and then resupplied to the bearing by a pump or the like. Various forms are applied to such a lubricating oil tank.

For example, JP 63-44446 A describes a configuration in which a plurality of partition plates is disposed in the middle of an inclined guide plate in an oil tank of an oil supply device. In the configuration described in JP 63-44446 A, lubricating oil flowing along the guide plate passes through the plurality of partition plates to remove air bubbles in oil.

SUMMARY

A lubricating oil tank may be supplied with lubricating oil from a plurality of bearings. In that case, a plurality of pipes as introduction portions for lubricating oil is connected to one lubricating oil tank. The plurality of pipes is disposed to the inside of the lubricating oil tank, thus causing a complicated internal structure of the lubricating oil tank and increased weight of the lubricating oil tank as a whole.

The disclosure has been made to solve the above problem, and an object of the disclosure is to provide a lubricating oil tank and a rotary machine system that can simplify the internal structure while including a plurality of introduction portions.

To solve the above problem, a lubricating oil tank according to the disclosure includes: a tank casing extending in a first direction and configured to store lubricating oil therein; a plurality of introduction portions configured to introduce the lubricating oil into an inside of the tank casing and disposed separately from each other in the first direction; a discharge portion disposed at a first end portion of the tank casing in the first direction and configured to discharge the lubricating oil stored in the inside of the tank casing; a receiving portion disposed below the plurality of introduction portions in a vertical direction inside the tank casing and configured to receive the lubricating oil introduced from the plurality of introduction portions and cause the lubricating oil to flow toward a second end portion of the tank casing in the first direction; and a strainer configured to capture a foreign matter in the lubricating oil having flowed on the receiving portion. The receiving portion is inclined downward in the vertical direction toward the second end portion in the first direction. The strainer is disposed at a position closer to the second end portion than the plurality of introduction portions in the first direction.

A rotary machine system according to the disclosure includes a rotary machine and the lubricating oil tank configured to store lubricating oil to be supplied to the rotary machine.

The lubricating oil tank and the rotary machine system according to the disclosure can simplify the internal structure while including a plurality of introduction portions.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments for implementing a lubricating oil tank and a rotary machine system according to the disclosure will be described with reference to the accompanying drawings. However, the disclosure is not limited only to these embodiments.

Configuration of Compressor System

Figure 1:
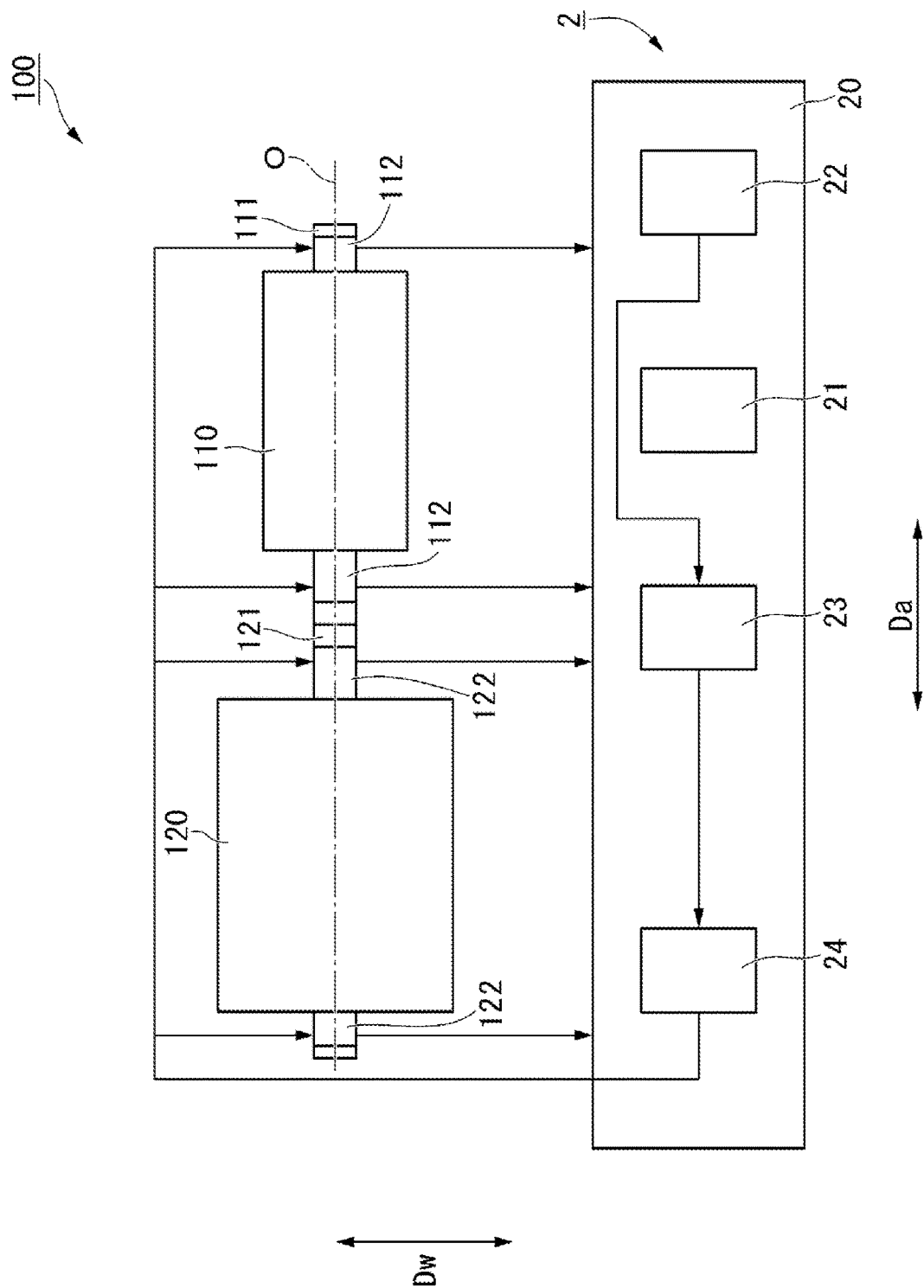
FIG. 1 is a schematic diagram illustrating a compressor system according to an embodiment of the disclosure.

FIG. 1 is a schematic diagram for describing the schematic configuration of a compressor system (rotary machine system) 100 according to an embodiment of the disclosure. As illustrated in FIG. 1, the compressor system (rotary machine system) 100 of the present embodiment includes a rotary driver 110, a compressor 120, and a lubricating oil supply device 2. The rotary driver 110 and the compressor 120 are rotary machines in the rotary machine system of the present embodiment.

Rotary Driver

The rotary driver 110 is coupled to the compressor 120. The rotary driver 110 drives the compressor 120. The rotary driver 110 includes an output shaft 111 that is rotatably driven. The rotary driver 110 of the present embodiment is an electric motor. The rotary driver 110 rotatably drives the output shaft 111 around an axis O always at a constant speed. The output shaft 111 has a cylindrical shape centered on the axis O. The rotary driver 110 includes a pair of driver bearings (bearings) 112 that rotatably supports the output shaft 111 around the axis O.

In the present embodiment, a direction orthogonal to a vertical direction Dv and in which the axis O extends is referred to as an axial direction Da. The axial direction Da is one of horizontal directions. A direction orthogonal to the axial direction Da and the vertical direction Dv is referred to as a width direction Dw. That is, the width direction Dw is one of the horizontal directions and is a direction different from the axial direction Da.

Compressor

The compressor 120 is disposed side by side spaced from the rotary driver 110 in the axial direction Da. The rotation of the output shaft 111 is transmitted to the compressor 120. The compressor 120 of the present embodiment is, for example, a multi-stage centrifugal compressor. The compressor 120 includes a rotor 121 coupled to the output shaft 111. The rotor 121 is rotated around the axis O. The rotor 121 has a cylindrical shape centered on the axis O. The compressor 120 includes a pair of compressor bearings (bearings) 122 that rotatably supports the rotor 121 around the axis O.

Lubricating Oil Supply Device

The lubricating oil supply device 2 collects lubricating oil used at the pair of driver bearings 112 and the pair of compressor bearings 122 and resupplies and circulates the lubricating oil. The lubricating oil supply device 2 of the present embodiment includes a lubricating oil tank 20, a heater 21, a pump 22, an oil cooler 23, and an oil filter 24. In the present embodiment, all devices constituting part of the lubricating oil supply device 2, such as the heater 21, the pump 22, the oil cooler 23, and the oil filter 24, are fixed on a tank casing 3 to be described below.

The lubricating oil tank 20 stores the lubricating oil to be supplied to the pair of driver bearings 112 and the pair of compressor bearings 122. The heater 21 heats the lubricating oil stored in the lubricating oil tank 20. The pump 22 pumps the lubricating oil stored in the lubricating oil tank 20 toward the driver bearings 112 and the compressor bearings 122. The oil cooler 23 cools the lubricating oil that has been pumped from the pump 22 and has not yet been supplied to the driver bearings 112 and the compressor bearings 122. The oil filter 24 removes foreign matters such as dust mixed in the lubricating oil cooled by the oil cooler 23. The lubricating oil that has passed through the oil filter 24 is supplied to the driver bearings 112 and the compressor bearings 122.

Figure 2:
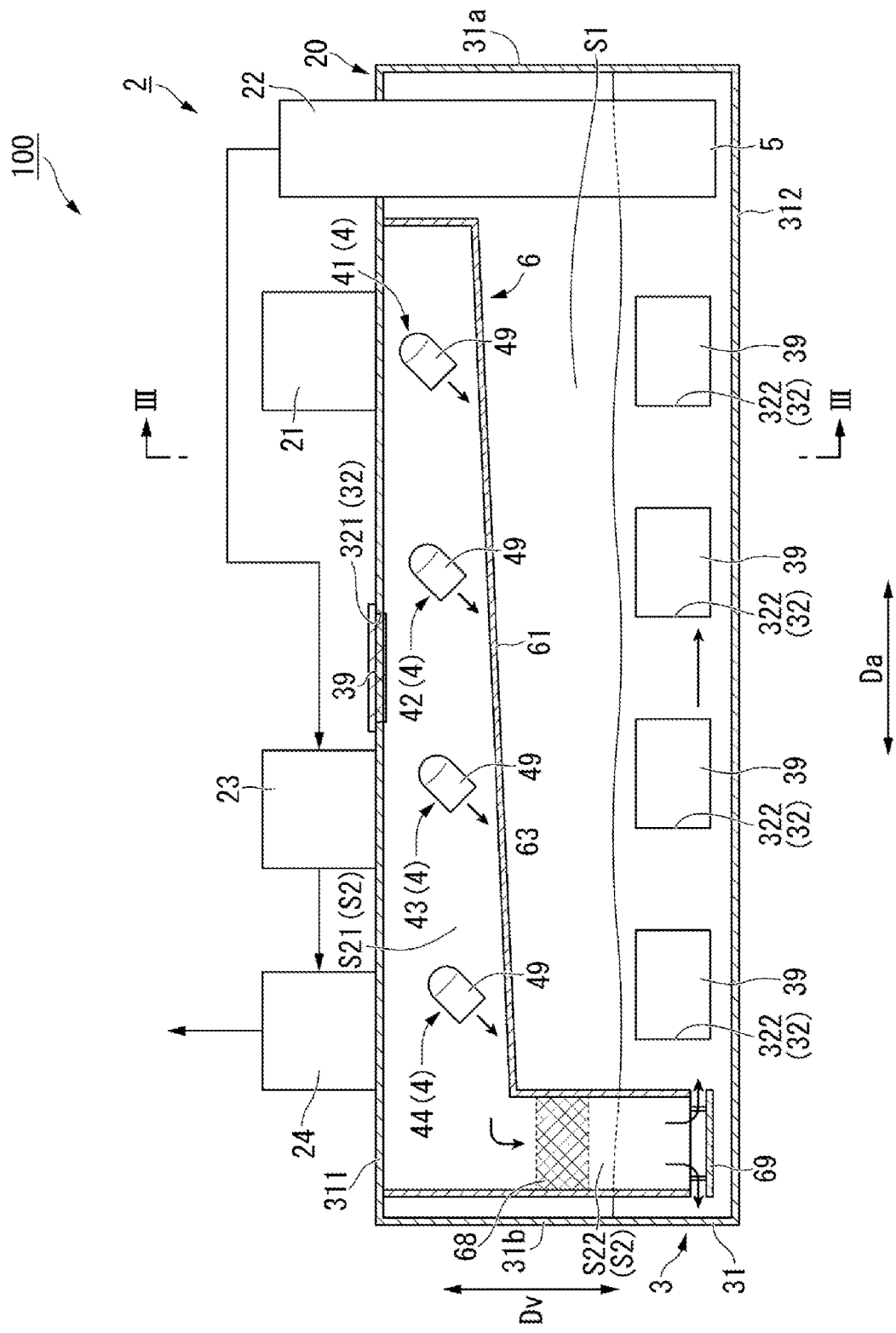
FIG. 2 is a schematic cross-sectional view illustrating a configuration of a lubricating oil tank according to an embodiment of the disclosure.

FIG. 2 is a schematic cross-sectional view illustrating the configuration of the lubricating oil tank 20 according to the embodiment of the disclosure. As illustrated in FIG. 2, the lubricating oil tank 20 includes the tank casing 3, introduction portions 4, a discharge portion 5, a receiving portion 6, a strainer 68, and a baffle plate 69.

Tank Casing

The tank casing 3 can store the lubricating oil therein. The tank casing 3 is formed in a tubular shape extending in a first direction. As illustrated in FIG. 2, the tank casing 3 of the present embodiment includes a tank casing main body 31 and lid portions 39. The first direction is one of horizontal directions and is a longitudinal direction of the tank casing main body 31. In the present embodiment, the first direction is the axial direction Da.

The tank casing main body 31 has a bottomed square tube shape with a hollow inside extending in the axial direction Da. The tank casing main body 31 extends from a first end portion 31a to a second end portion 31b in the axial direction Da. The tank casing main body 31 is formed in a size that can secure a flow time sufficient for removing bubbles in the lubricating oil while the lubricating oil stored in the tank casing main body 31 flows through from the second end portion 31b to the first end portion 31a in the axial direction Da. The tank casing main body 31 is formed with a plurality of openings 32 penetrating inside and outside the tank casing main body 31. Each of the openings 32 is formed in such a size that an operator can pass therethrough. In the present embodiment, the openings 32 include an upper opening 321 and a plurality of lower openings 322.

The upper opening 321 is formed at the tank casing main body 31 above the receiving portion 6 in the vertical direction Dv. The upper opening 321 of the present embodiment is formed so as to penetrate through an upper wall portion 311 constituting a top surface of the tank casing main body 31. Only one upper opening 321 is formed near the center of the tank casing main body 31 in the axial direction Da.

The lower openings 322 are formed at the tank casing main body 31 below the receiving portion 6 in the vertical direction Dv. The lower openings 322 of the present embodiment are formed so as to penetrate through a side wall 313 constituting a side surface of the tank casing main body 31. The plurality (four in the present embodiment) of the lower openings 322 are formed separately from each other in the axial direction Da.

The lid portions 39 close the openings 32. The lid portions 39 are attachable to and detachable from the tank casing main body 31. One lid portion 39 is disposed for one opening 32. Therefore, the lid portions 39 of the present embodiment each close the upper opening 321 and the plurality of lower openings 322.

The introduction portions 4 can introduce the lubricating oil into the tank casing 3. The introduction portions 4 are disposed separately from each other in the axial direction Da. Each of the introduction portions 4 is connected to a bearing. In the present embodiment, the introduction portions 4 include a first introduction portion 41 connected to one of the driver bearings 112, a second introduction portion 42 connected to the other of the driver bearings 112, a third introduction portion 43 connected to one of the compressor bearings 122, and a fourth introduction portion 44 connected to the other of the compressor bearings 122. Each of the introduction portions 4 is disposed at a position overlapping with one of the lower openings 322 in the axial direction Da. Each of the introduction portions 4 of the present embodiment includes a main pipe 48 and an inlet pipe 49.

Figure 3:
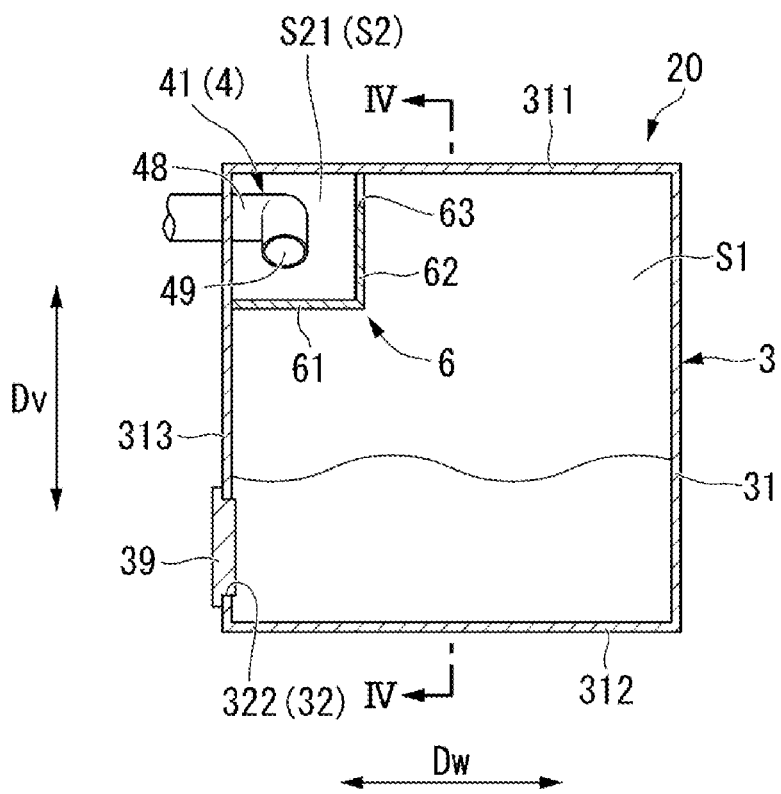
FIG. 3 is a schematic cross-sectional view taken along the line III-III in FIG. 2 illustrating the configuration of the lubricating oil tank according to an embodiment of the disclosure.

As illustrated in FIG. 3, the main pipe 48 is disposed so as to penetrate through the side wall 313 of the tank casing main body 31. The main pipe 48 is a pipe connected to a bearing that is a supply source of the lubricating oil. The main pipe 48 extends in the width direction Dw. The inlet pipe 49 is connected to the main pipe 48 inside the tank casing 3. As illustrated in FIGS. 2 and 3, the inlet pipe 49 opens downward in the vertical direction Dv and toward the second end portion 31b of the tank casing main body 31 in the axial direction Da. That is, when viewed from the width direction Dw, the inlet pipe 49 extends, not straightly, but obliquely toward the vertical direction Dv. The inlet pipe 49 is installed at an inclination of ½5 degrees, for example.

As illustrated in FIG. 2, the discharge portion 5 can discharge the lubricating oil stored in the tank casing 3 to the outside of the tank casing 3. The discharge portion 5 is disposed close to the first end portion 31a of the tank casing main body 31 in the axial direction Da. The discharge portion 5 of the present embodiment is a suction port of the pump 22. The discharge portion 5 sucks out the lubricating oil from a position close to a lower wall portion 312 forming a bottom portion of the tank casing main body 31. In the present embodiment, only one discharge portion 5 is disposed. The disclosure is not limited to a configuration in which only one discharge portion 5 is disposed, but a plurality of discharge portions 5 may be disposed. However, when a plurality of discharge portions 5 is disposed, preferably, all the discharge portions 5 are disposed at positions close to the first end portion 31a of the tank casing main body 31 such that the positions overlap each other in the axial direction Da.

The receiving portion 6 receives the lubricating oil introduced from the introduction portions 4 and causes the lubricating oil to flow toward the second end portion 31b of the tank casing main body 31 in the axial direction Da. The receiving portion 6 is disposed below the introduction portions 4 in the vertical direction Dv in the tank casing 3. The receiving portion 6 is inclined downward in the vertical direction Dv from the first end portion 31a toward the second end portion 31b in the axial direction Da. The receiving portion 6 forms a flow space S2 partitioned from a storage space S1 in which the lubricating oil is stored in the tank casing 3. As illustrated in FIG. 3, the receiving portion 6 of the present embodiment forms the flow space S2 as a flow path having a rectangular cross section. The flow space S2 is a space through which the lubricating oil that has been introduced from the introduction portions 4 and has not yet been supplied to the storage space S1 flows. As illustrated in FIG. 2, the flow space S2 includes a first flow space S21 extending from the first end portion 31a toward the second end portion 31b in the axial direction Da, and a second flow space S22 communicating with the first flow space S21 near the second end portion 31b and extending straightly in the vertical direction Dv. That is, the receiving portion 6 forms an L-shaped flow path inside the tank casing main body 31. In addition, as illustrated in FIGS. 2 and 3, the receiving portion 6 of the present embodiment includes a receiving surface 61, a partition wall 62, and a communication hole 63.

The receiving surface 61 is a plate-like member on which the lubricating oil flows. The receiving surface 61 is disposed below the introduction portions 4 in the vertical direction Dv. The receiving surface 61 extends in the axial direction Da and receives the lubricating oil supplied from the introduction portions 4. The receiving surface 61 is disposed above an oil level of the lubricating oil stored in the tank casing 3 in the vertical direction Dv. In the receiving surface 61, a portion that comes into contact with the lubricating oil is formed of a smooth surface that does not obstruct the flow of the lubricating oil. The receiving surface 61 linearly extends at an angle in the first flow space S21 when viewed from the width direction Dw. The receiving surface 61 is installed at an inclination of at least 1/100 degrees that is smaller than the inclination of the inlet pipe 49, for example. The receiving surface 61 is connected to the side wall 313 of the tank casing main body 31.

The partition wall 62 extends upward in the vertical direction Dv from the receiving surface 61. The partition wall 62 extends in parallel with the side wall 313 of the tank casing main body 31. The partition wall 62 is connected to the upper wall portion 311.

Figure 4:
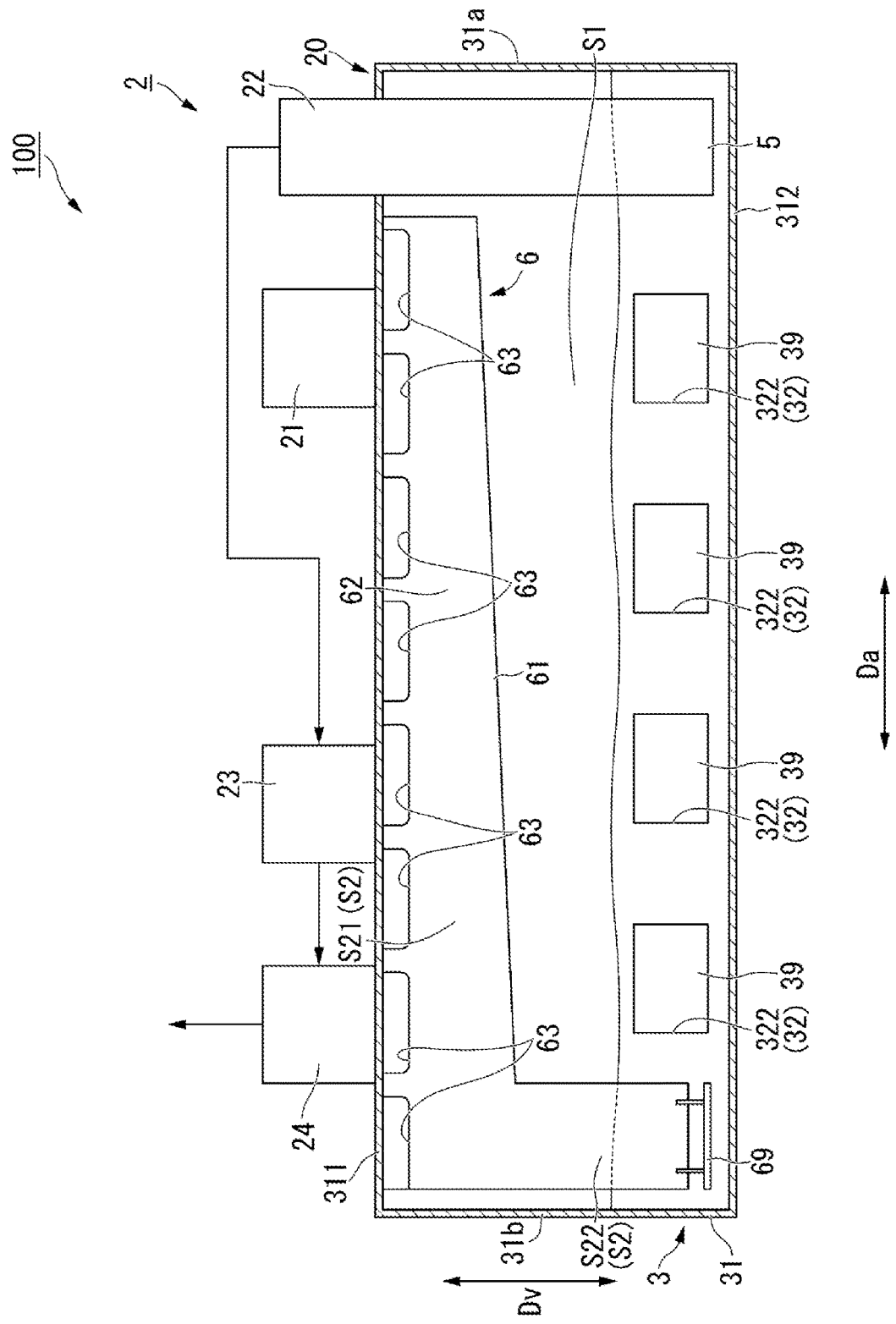
FIG. 4 is a schematic cross-sectional view taken along the line IV-IV in FIG. 3 illustrating the configuration of the lubricating oil tank according to an embodiment of the disclosure.

The communication hole 63 communicates between the storage space S1 and the flow space S2. The communication hole 63 penetrates through the partition wall 62 in the width direction Dw. The communication hole 63 is formed in an upper portion of the partition wall 62 in the vertical direction Dv. That is, the communication hole 63 is disposed above the receiving surface 61 in the vertical direction Dv. As illustrated in FIG. 4, a plurality of communication holes 63 is disposed spaced in the axial direction Da.

As illustrated in FIG. 2, the strainer 68 can capture foreign matters in the lubricating oil that have flowed on the receiving portion 6. Only one strainer 68 is disposed. The strainer 68 is disposed at a position closer to the second end portion 31b than the introduction portions 4 in the axial direction Da. Specifically, the strainer 68 is detachably attached to the receiving portion 6 in the second flow space S22. The strainer 68 is disposed so as to come into contact with the lubricating oil flowing downward in the vertical direction Dv in the second flow space S22. The strainer 68 can capture foreign matters contained in the lubricating oil flowing through the second flow space S22 to suppress the foreign matters from flowing into the storage space S1. Accordingly, only the lubricating oil flows into the storage space S1 by passing through the strainer 68. The strainer 68 is, for example, a mesh-like net member made of metal.

The baffle plate 69 reduces the impact of the lubricating oil at an outlet of the receiving portion 6 such that the lubricating oil having flowed on the receiving portion 6 does not directly collide with a bottom surface of the tank casing main body 31. The baffle plate 69 is disposed away from the outlet of the receiving portion 6 in the vertical direction Dv. The baffle plate 69 is a plate-like member disposed such that a main surface thereof faces the vertical direction Dv. The lubricating oil having flowed downward in the vertical direction Dv through the second flow space S22 collides with the baffle plate 69, whereby the flow direction of the lubricating oil is changed to a horizontal direction. In this way, the baffle plate 69 causes the lubricating oil to flow in the horizontal direction with respect to the bottom portion of the tank casing main body 31.

Operational Effects

In the lubricating oil tank 20 and the compressor system 100 configured as described above, the lubricating oil used in the respective pair of driver bearings 112 is fed to the first introduction portion 41 and the second introduction portion 42. On the other hand, the lubricating oil used in the respective pair of compressor bearings 122 is fed to the third introduction portion 43 and the fourth introduction portion 44. The respective lubricating oil introduced into the tank casing 3 from the first introduction portion 41, the second introduction portion 42, the third introduction portion 43, and the fourth introduction portion 44 drops onto the receiving portion 6. The lubricating oil that has dropped onto the receiving portion 6 flows through the first flow space S21 toward the second end portion 31b in the axial direction Da along the receiving surface 61 that is linearly inclined downward in the vertical direction Dv toward the second end portion 31b in the axial direction Da. Subsequently, the lubricating oil having flowed through the first flow space S21 reaches the second flow space S22 and drops toward the bottom portion of the tank casing main body 31. Then, the lubricating oil comes into contact with the strainer 68 in the course of dropping down the second flow space S22. Accordingly, foreign matters contained in the lubricating oil are captured by the strainer 68, and only the lubricating oil flows into the storage space S1. The lubricating oil having flowed into the storage space S1 stagnates, flows slowly from the second end portion 31b toward the first end portion 31a in the axial direction Da inside the tank casing main body 31, and is deaerated. The lubricating oil stored in the tank casing main body 31 is heated by the heater 21. Subsequently, the lubricating oil having reached the discharge portion 5 is sucked up by the pump 22 and fed again to the pair of driver bearings 112 and the pair of compressor bearings 122. During this process, the lubricating oil fed from the pump 22 is cooled by the oil cooler 23. Further, foreign matters such as dust are removed from the cooled lubricating oil by the oil filter 24, and the lubricating oil is fed to the pair of driver bearings 112 and the pair of compressor bearings 122.

In this way, the lubricating oil introduced from the introduction portions 4 is fed to the storage space S1 by the receiving portion 6. Thus, it is not necessary to extend a plurality of pipes to a position where the lubricating oil is stored inside the tank casing main body 31. As a result, the internal structure of the tank casing main body 31 can be simplified. In addition, foreign matters in the lubricating oil having flowed on the receiving portion 6 are captured by only one strainer 68. That is, the strainer 68 is not attached to each of the introduction portions 4. Thus, it is not necessary to attach a plurality of long pipes and a plurality of strainers 68 to the tank casing main body 31, and the weight of the lubricating oil tank 20 can be reduced. Accordingly, the internal structure can be simplified while the plurality of introduction portions 4 is included.

Further, the receiving portion 6 forms the flow space S2 partitioned from the storage space S1 in which the lubricating oil is stored. In the flow space S2, the receiving portion 6 guides the lubricating oil with the receiving surface 61 disposed below the introduction portions 4 in the vertical direction Dv. On the receiving surface 61, the lubricating oil flows from the first flow space S21 toward the second flow space S22. Furthermore, the plurality of communication holes 63 is formed in the partition wall 62 extending upward in the vertical direction Dv from the receiving surface 61. Thus, air bubbles (gas) released from the lubricating oil in the course of flowing on the receiving surface 61 are discharged from the communication holes 63 to the storage space S1 without accumulating in the first flow space S21. Therefore, it is possible to suppress the occurrence of adverse effects such as backflow to the driver bearings 112 and the compressor bearings 122 due to the accumulation of air bubbles in the vicinity of the introduction portions 4.

In addition, the receiving surface 61 is disposed above the oil level of the lubricating oil stored in the storage space S1 in the vertical direction Dv. Thus, the lubricating oil stored in the storage space S1 does not come into contact with the receiving surface 61. Therefore, regardless of the amount of the lubricating oil stored in the storage space S1, the stored lubricating oil does not affect the lubricating oil flowing on the receiving surface 61. Accordingly, the receiving surface 61 can cause the lubricating oil introduced from the introduction portions 4 to flow in a stable manner.

In addition, each of the introduction portions 4 includes the inlet pipe 49 which is connected to the main pipe 48 and opens downward in the vertical direction Dv and toward the second end portion 31b in the axial direction Da. The lubricating oil is supplied from the inlet pipe 49 toward the receiving surface 61. Thus, the lubricating oil is supplied to the receiving surface 61 in a state of being propelled toward the second end portion 31b in the axial direction Da. As a result, the lubricating oil flowing on the receiving surface 61 can be propelled so as to stably flow toward the second end portion 31b.

In addition, the upper opening 321 and the lower openings 322 are closed by the lid portions 39 that are detachable from the tank casing main body 31. That is, by detaching the lid portions 39 from the tank casing main body 31, each of the upper opening 321 and the lower openings 322 is put into an open state. Thus, the interior of the tank casing main body 31 can be accessed through the upper opening 321 and the lower openings 322. Accordingly, an operator can clean the interior of the tank casing main body 31 through the upper opening 321 and the lower openings 322.

In particular, the lower openings 322 are formed below the oil level of the lubricating oil in the vertical direction Dv, the operator can easily access portions close to the bottom portion of the tank casing main body 31. Wastes called sludge are often deposited at the bottom portion of the tank casing main body 31 due to the accumulation of the lubricating oil. Since the lower openings 322 are formed, such sludge can be easily removed from the tank casing main body 31.

Further, the plurality of lower openings 322 is disposed separately from each other in the axial direction Da. Thus, the bottom portion of the tank casing main body 31 can be accessed from a plurality of positions in the axial direction Da. Accordingly, the sludge can be easily removed in a wide range inside the tank casing main body 31.

OTHER EMBODIMENTS

An embodiment according to the disclosure has been described in detail with reference to the drawings. However, the specific configuration of the disclosure is not limited to this embodiment. Design change without departing from the main gist of the disclosure or the like is also included.

For example, the foregoing embodiment has described an example in which the compressor system 100 includes the rotary driver 110 and the compressor 120 as rotary machines, but the rotary machine system is not limited thereto. For example, the rotary machine system may include a turbine as a rotary machine. Further, the rotary machine system is not limited to a configuration in which both the rotary driver 110 and the compressor 120 are provided. The rotary machine system may include only one of the rotary driver 110 and the compressor 120.

In the compressor system 100, the rotary driver 110 and the compressor 120 are not limited to being directly connected to each other. The rotary driver 110 and the compressor 120 may be indirectly connected to each other via a transmission.

The devices constituting part of the lubricating oil supply device 2, such as the heater 21, the pump 22, the oil cooler 23, and the oil filter 24, are not limited to have a structure in which all are disposed on the tank casing 3. For example, part of devices such as the oil cooler 23 may be disposed other than on the tank casing 3.

In the lubricating oil tank 20, the strainer 68 may be always disposed, or may be temporarily disposed such that the strainer 68 is attached only during initial operation of the compressor system 100 and removed thereafter.

Supplementary Notes

The lubricating oil tank 20 and the rotary machine system described in the embodiment is understood as follows, for example.

(1) A lubricating oil tank 20 according to a first aspect includes: a tank casing 3 extending in a first direction and configured to store lubricating oil therein; a plurality of introduction portions 4 configured to introduce the lubricating oil into an inside of the tank casing 3 and disposed separately from each other in the first direction; a discharge portion 5 disposed at a first end portion 31a of the tank casing 3 in the first direction and configured to discharge the lubricating oil stored in the inside of the tank casing 3; a receiving portion 6 disposed below the plurality of introduction portions 4 in a vertical direction Dv inside the tank casing 3 and configured to receive the lubricating oil introduced from the plurality of introduction portions 4 and cause the lubricating oil to flow toward a second end portion 31b of the tank casing 3 in the first direction; and a strainer 68 configured to capture a foreign matter in the lubricating oil having flowed on the receiving portion 6. The receiving portion 6 is inclined downward in the vertical direction Dv toward the second end portion 31*b* in the first direction. The strainer 68 is disposed at a position closer to the second end portion 31*b* than the plurality of introduction portions 4 in the first direction.

With this configuration, the lubricating oil introduced from the plurality of introduction portions 4 is fed by the receiving portion 6 to a space in which the lubricating oil is stored. Thus, it is not necessary to extend a plurality of pipes to a position where the lubricating oil is stored inside the tank casing 3. As a result, the internal structure of the tank casing 3 can be simplified. In addition, foreign matters in the lubricating oil having flowed on the receiving portion 6 are captured by only one strainer 68. That is, the strainer 68 is not attached to each of the plurality of introduction portions 4. Thus, it is not necessary to attach a plurality of long pipes and a plurality of strainers 68 to the tank casing 3, and the weight of the lubricating oil tank 20 can be reduced. Accordingly, the internal structure can be simplified while the plurality of introduction portions 4 is included.

(2) A lubricating oil tank 20 according to a second aspect is the lubricating oil tank 20 of (1), wherein the receiving portion 6 forms a flow space S2 partitioned from a storage space S1 in which the lubricating oil is stored in the tank casing 3, and the receiving portion 6 includes a receiving surface 61 extending in the first direction below the plurality of introduction portions 4 in the vertical direction Dv and configured to receive the lubricating oil, a partition wall 62 extending upward in the vertical direction Dv from the receiving surface 61, and a communication hole 63 extending through the partition wall 62 and configured to communicate between the storage space S1 and the flow space S2.

With this configuration, in the flow space S2, the receiving portion 6 guides the lubricating oil with the receiving surface 61 disposed below the plurality of introduction portions 4 in the vertical direction Dv. Furthermore, a plurality of communication holes 63 is formed in the partition wall 62 extending upward in the vertical direction Dv from the receiving surface 61. Thus, air bubbles (gas) released from the lubricating oil in the course of flowing on the receiving surface 61 are discharged from the communication holes 63 to the storage space S1 without accumulating in the flow space S2. Therefore, it is possible to suppress the occurrence of adverse effects such as backflow to bearings due to the accumulation of air bubbles in the vicinity of the introduction portions 4.

(3) A lubricating oil tank 20 according to a third aspect is the lubricating oil tank 20 of (2), wherein the receiving surface 61 is disposed above an oil level of the lubricating oil stored in the tank casing 3 in the vertical direction Dv.

With this configuration, the lubricating oil stored in the storage space S1 does not come into contact with the receiving surface 61. Thus, regardless of the amount of the lubricating oil stored in the storage space S1, the stored lubricating oil does not affect the lubricating oil flowing on the receiving surface 61. Accordingly, the receiving surface 61 can cause the lubricating oil introduced from the plurality of introduction portions 4 to flow in a stable manner.

(4) A lubricating oil tank 20 according to a fourth aspect is the lubricating oil tank 20 of any one of (1) to (3), wherein the introduction portions 4 each include a main pipe 48 disposed penetrating the tank casing 3 and an inlet pipe 49 connected to the main pipe 48 inside the tank casing 3 and opening downward in the vertical direction Dv and toward the second end portion 31*b* in the first direction.

With this configuration, the lubricating oil is supplied from the inlet pipe 49 toward the receiving surface 61. Thus, the lubricating oil is supplied to the receiving surface 61 in a state of being propelled toward the second end portion 31*b* in the first direction. As a result, the lubricating oil flowing on the receiving surface 61 can be propelled so as to stably flow toward the second end portion 31*b*.

(5) A lubricating oil tank 20 according to a fifth aspect is the lubricating oil tank 20 of any one of (1) to (4), wherein the tank casing 3 includes a tank casing main body 31 in which an opening 32 configured to communicate between the inside and the outside of the tank casing is formed below an oil level of the lubricating oil stored inside the tank casing in the vertical direction Dv and a lid portion 39 attachable to and detachable from the tank casing main body 31 and configured to close the opening 32.

With this configuration, by detaching the lid portion 39 from the tank casing main body 31, the opening 32 is put into an open state. Thus, the interior of the tank casing main body 31 can be accessed through the opening 32. Accordingly, an operator can clean the interior of the tank casing main body 31 through the opening 32. In particular, the opening 32 is formed below the oil level of the lubricating oil in the vertical direction Dv, the operator can easily access a portion close to the bottom portion of the tank casing main body 31. Wastes called sludge are often deposited at the bottom portion of the tank casing main body 31 due to the accumulation of the lubricating oil. Since the opening 32 is formed, such sludge can be easily removed from the tank casing main body 31.

(6) A lubricating oil tank 20 according to a sixth aspect is the lubricating oil tank 20 of (5), wherein a plurality of the openings 32 and a plurality of the lid portions 39 are disposed separately from each other in the first direction.

Thus, the bottom portion of the tank casing main body 31 can be accessed from a plurality of positions in the first direction. Accordingly, the sludge can be easily removed in a wide range in the interior of the tank casing main body 31.

(7) A rotary machine system according to a seventh aspect includes a rotary machine and the lubricating oil tank 20 of any one of (1) to (6) configured to store lubricating oil to be supplied to the rotary machine.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A lubricating oil tank, comprising:
a tank casing extending in a first direction and configured to store lubricating oil therein;
a plurality of introduction portions configured to introduce the lubricating oil into an inside of the tank casing and disposed separately from each other in the first direction;
a discharge portion disposed at a first end portion of the tank casing in the first direction and configured to discharge the lubricating oil stored in the inside of the tank casing;
a receiving portion disposed below the plurality of introduction portions in a vertical direction inside the tank casing and configured to receive the lubricating oil introduced from the plurality of introduction portions and cause the lubricating oil to flow toward a second end portion of the tank casing in the first direction; and a strainer configured to capture a foreign matter in the lubricating oil having flowed on the receiving portion, wherein the receiving portion is inclined downward in the vertical direction toward the second end portion in the first direction, the strainer is disposed at a position closer to the second end portion than the plurality of introduction portions in the first direction, and the introduction portions each include a main pipe disposed penetrating the tank casing and an inlet pipe connected to the main pipe inside the tank casing and opening downward in the vertical direction and toward the second end portion in the first direction.

2. The lubricating oil tank according to claim 1, wherein the receiving portion forms a flow space partitioned from a storage space in which the lubricating oil is stored in the tank casing, and the receiving portion includes a receiving surface extending in the first direction below the plurality of introduction portions in the vertical direction and configured to receive the lubricating oil, a partition wall extending upward in the vertical direction from the receiving surface, and a communication hole extending through the partition wall and configured to communicate between the storage space and the flow space.

3. The lubricating oil tank according to claim 2, wherein the receiving surface is disposed above an oil level of the lubricating oil stored in the tank casing in the vertical direction.

4. A rotary machine system, comprising:
a rotary machine; and
a lubricating oil tank according to claim 1 configured to store lubricating oil to be supplied to the rotary machine.

5. A lubricating oil tank, comprising:
a tank casing extending in a first direction and configured to store lubricating oil therein;

a plurality of introduction portions configured to introduce the lubricating oil into an inside of the tank casing and disposed separately from each other in the first direction;

a discharge portion disposed at a first end portion of the tank casing in the first direction and configured to discharge the lubricating oil stored in the inside of the tank casing;

a receiving portion disposed below the plurality of introduction portions in a vertical direction inside the tank casing and configured to receive the lubricating oil introduced from the plurality of introduction portions and cause the lubricating oil to flow toward a second end portion of the tank casing in the first direction; and a strainer configured to capture a foreign matter in the lubricating oil having flowed on the receiving portion, wherein the receiving portion is inclined downward in the vertical direction toward the second end portion in the first direction, the strainer is disposed at a position closer to the second end portion than the plurality of introduction portions in the first direction, and the tank casing includes a tank casing main body in which an opening configured to communicate between the inside and an outside of the tank casing is formed below an oil level of the lubricating oil stored inside the tank casing in the vertical direction and a lid portion attachable to and detachable from the tank casing main body and configured to close the opening.

6. The lubricating oil tank according to claim 5, wherein a plurality of the openings and a plurality of the lid portions are disposed separately from each other in the first direction.

* * * * *